(12) United States Patent
Lu et al.

(10) Patent No.: US 12,074,498 B2
(45) Date of Patent: Aug. 27, 2024

(54) FAN STATOR STRUCTURE

(71) Applicant: ASIA VITAL COMPONENTS (CHINA) CO., LTD., Shenzhen (CN)

(72) Inventors: Yeh-Chih Lu, Shenzhen (CN); Hsin-Hung Chen, Shenzhen (CN)

(73) Assignee: ASIA VITAL COMPONENTS (CHINA) CO., LTD., Shenzhen (CN)

( * ) Notice: Subject to any disclaimer, the term of this patent is extended or adjusted under 35 U.S.C. 154(b) by 31 days.

(21) Appl. No.: 17/065,523

(22) Filed: Oct. 8, 2020

(65) Prior Publication Data

US 2022/0115928 A1 Apr. 14, 2022

(51) Int. Cl.
*H02K 5/22* (2006.01)
*H02K 1/14* (2006.01)
(Continued)

(52) U.S. Cl.
CPC ............ *H02K 5/225* (2013.01); *H02K 1/146* (2013.01); *H02K 5/22* (2013.01); *H02K 11/30* (2016.01);
(Continued)

(58) Field of Classification Search
CPC ............ F04D 25/0693; F04D 25/0633; F04D 25/0646; H02K 1/146; H02K 3/522;
(Continued)

(56) References Cited

U.S. PATENT DOCUMENTS 5,173,628 A * 12/1992 Yoshida .................... H02K 3/50
310/67 R
2006/0012261 A1 1/2006 Ku et al.
(Continued)

FOREIGN PATENT DOCUMENTS

CN 2840485 Y * 11/2006
CN 2867706 Y * 2/2007
(Continued)

OTHER PUBLICATIONS

Chen et al, Stator Device of Motor, Nov. 22, 2006, CN 2840485 (English Machine Translation) (Year: 2006).*
Liu et al, Stator Device of Motor, Feb. 7, 2007, CN 2867706 (English Machine Translation) (Year: 2007).*
Search Report dated Jan. 20, 2021 issued by Taiwan Intellectual Property Office for counterpart application No. 109133381.

*Primary Examiner* — Alexander A Singh
(74) *Attorney, Agent, or Firm* — Brad J. Thorson; DeWitt LLP

(57) ABSTRACT

A fan stator structure includes a silicon steel sheet lamination formed of a plurality of laminated silicon steel sheets located between a set of insulating supports and having coils wound thereon; and a plurality of conducting coil end holders respectively including a fixing section and a connecting section, and a receiving zone located between the two sections. The fixing and the connecting section are located at two opposite ends of the conducting coil end holder, and the fixing section is connected to the set of insulating supports. The receiving zone is configured for receiving a front and a back end of the coils, so that the front and back ends of the coils are in contact with the conducting coil end holders. With the conducting coil end holders, the fan stator structure can be manufactured with simplified procedures, reduced time and labor costs, and upgraded good yield rate.

5 Claims, 7 Drawing Sheets

(51) Int. Cl.
  *H02K 11/30* (2016.01)
  *H02K 11/33* (2016.01)
  *F04D 25/06* (2006.01)
  *H02K 3/52* (2006.01)
(52) U.S. Cl.
  CPC .......... *H02K 11/33* (2016.01); *F04D 25/0646* (2013.01); *H02K 3/522* (2013.01); *H02K 2203/03* (2013.01)
(58) Field of Classification Search
  CPC ...... H02K 2203/03; H02K 5/22; H02K 5/225; H02K 11/30; H02K 11/33; H02K 15/08; H02K 3/32; H02K 3/38
  USPC .................................. 310/71, 68 R, 214, 215
  See application file for complete search history.

(56) References Cited

U.S. PATENT DOCUMENTS

2020/0161924 A1* 5/2020 Yasumura ........... F04D 25/0646
2021/0099043 A1* 4/2021 Shiraishi ............... F04D 29/023

FOREIGN PATENT DOCUMENTS

| CN | 108512335 B | 6/2020 |
|----|-------------|--------|
| JP | H6-351185 A | 12/1994 |
| TW | 200726038 A | 7/2007 |
| TW | 200924348 A | 6/2009 |
| TW | M604982 | 12/2020 |

* cited by examiner

FAN STATOR STRUCTURE

FIELD OF THE INVENTION

The present invention relates to a fan stator structure, and more particularly, to a fan stator structure that can be manufactured with reduced labor and time costs while enables upgraded good yield rate.

BACKGROUND OF THE INVENTION

Please refer to FIGS. 1A and 1B, in which a conventional stator 1 is shown. A stator and a correspondingly provided rotor are two main components of a fan, and the stator causes the rotor to rotate through electromagnetic induction. As shown in FIGS. 1A and 1B, the conventional stator 1 includes a silicon steel sheet assembly formed of a plurality of laminated silicon steel sheets 11; an upper and a lower insulating supports 12, 13 provided to an upper and a lower end of the laminated silicon steel sheets 11, respectively; a plurality of coils 14 wound on around poles of the laminated silicon steel sheets 11; and a circuit board 17, to which the coils 14 are welded to complete the stator manufacturing procedures.

According to a conventional technique, the coils 14 of the stator 1 can be wound manually or using an automated machine. In the conventional winding operation, first bind a front end 141 of a lead wire for forming each coil 14 to one of the poles by turning the lead wire one circle around the pole, and the front end 141 is kept as a free end for twisting later. The coil winding is performed on all poles. After the coil winding, back ends 142 of the lead wires for forming the coils 14 and the front ends 141 thereof are organized one by one and are correspondingly twisted together to form twisted strands, as shown in FIG. 1A. And, the twisted strands formed of the front ends 141 and back ends 142 of the coils 14 by different operators are often different in strand thickness and length, and therefore, they must be manually trimmed to be adjusted to an appropriate length.

Further, when inserting and electrically connecting the twisted and trimmed strands of the front and back ends 141, 142 of the coils 14 to the circuit board 17, the strands are fixed to the circuit board 17 by tin welding manually. Since the twisted strands of the front and back ends 141, 142 of the coils 14 are thicker than the original lead wires, vias 171 formed on the circuit board 17 must be correspondingly expanded. A problem of the expanded vias 171 is tin leaking 181 and large weld nuggets 182 formed on the circuit board 17 at the welded spots. The front and back ends 141, 142 of the coils 14 after welding have tin solder remained thereon and look ugly. Further, the front and back ends 141, 142 of the coils 14 tend to cause a short circuit if they are too long and therefore, must be manually cut off, which again consumes a lot of time and labors. While the cores 14 of the conventional fan stator 1 can be wound using a mechanically automated machine, the front and back ends 141, 142 thereof still require manual organizing, trimming and cutting procedures after they are welded to the circuit board 17. These factors result in complicated, time and labor consuming production procedures and low good yield of the conventional fan stator 1.

It is therefore an important target among the fan stator manufacturers to work out a way for improving the disadvantages in the conventional fan stator to largely simplify the manufacturing procedures, reduce the time and labor consumption, and increase the good yield rate of the fan stator.

SUMMARY OF THE INVENTION

A primary object of the present invention is to provide a fan stator structure that involves simplified manufacturing procedures and enables largely reduced time and labor costs and increased good yield rate.

To achieve the above and other objects, the fan stator structure provided according to the present invention includes a silicon steel sheet lamination and a plurality of conducting coil end holders. The silicon steel sheet lamination is formed of a plurality of laminated silicon steel sheets located between a set of insulating supports and has coils wound thereon. The conducting coil end holders respectively include a fixing section, a connecting section, and a receiving zone located between the fixing section and the connecting section. The fixing section and the connecting section are located at two opposite ends of the conducting coil end holder, and the fixing section is connected to the set of insulating supports. The receiving zone is configured for receiving a front and a back end of the coils therein, so that the front and back ends of the coils are in electrical contact with the conducting coil end holders. With the conducting coil end holders, the fan stator structure of the present invention can be manufactured with simplified procedures, reduced time and labor costs, and upgraded good yield rate.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

The present invention will now be described with a preferred embodiment thereof and by referring to the accompanying drawings.

Figure 1B:
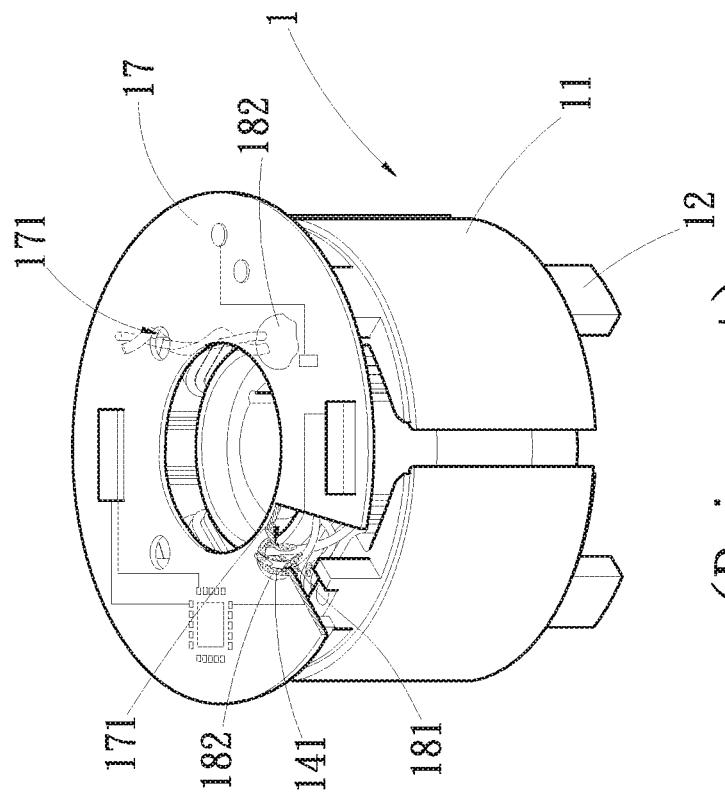
FIG. 1B is similar to FIG. 1A to show the conventional fan stator with the circuit board connected thereto.
Figure 1A:
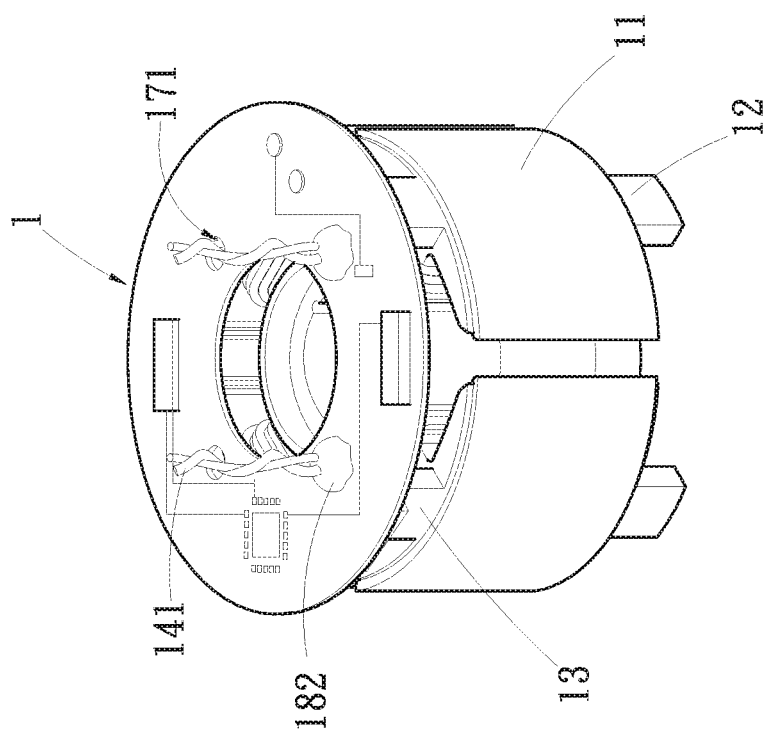
FIG. 1A is a perspective view of a conventional fan stator, showing the manner of processing coils and connecting the coils to a circuit board.
Figure 2A:
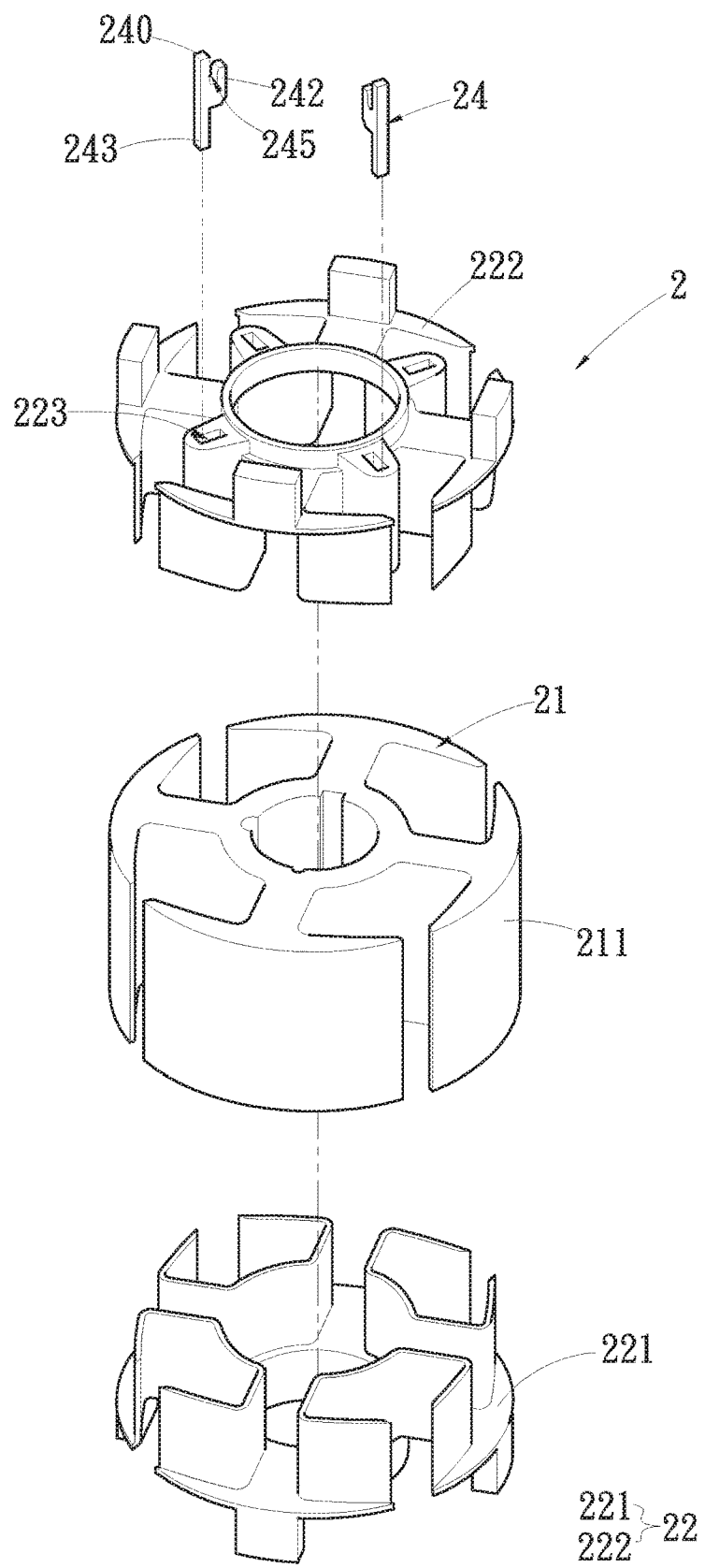
FIG. 2A is an upside-down exploded perspective view of a fan stator structure according to an embodiment of the present invention.
Figure 2B:
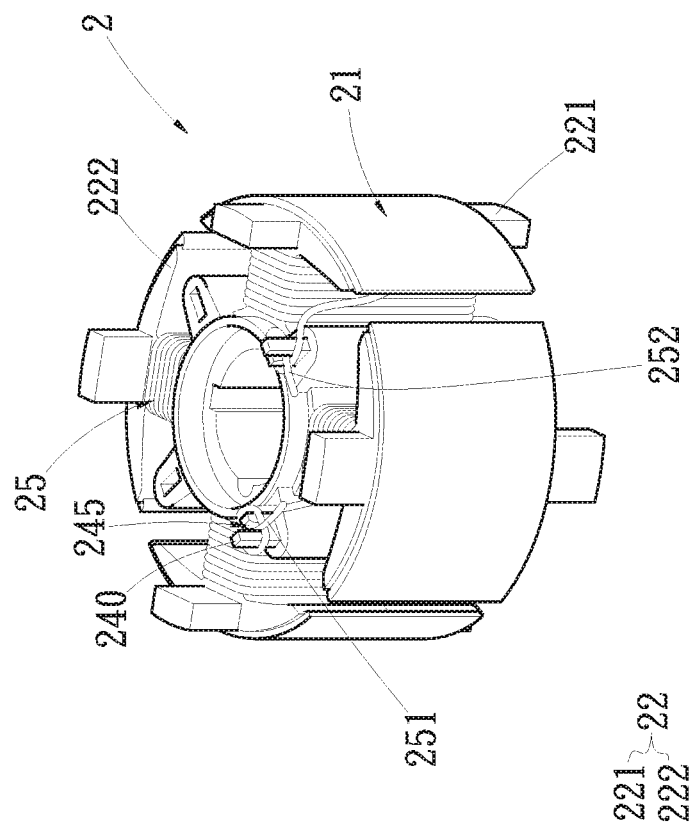
FIG. 2B is an assembled view of FIG. 2A.

Please refer to FIGS. 2A, 2B, 3A and 5, in which a fan stator structure 2 according to an embodiment of the present invention is shown. The fan stator structure 2 includes a silicon steel sheet lamination 21, a set of insulating supports 22, a plurality of conducting coil end holders 24, and a plurality of coils 25. The silicon steel sheet lamination 21 is formed of a plurality of laminated silicon steel sheets 211. The set of insulating supports 22 includes an upper insulating support 221 and a lower insulating support 222 provided at an upper end and a lower end of the silicon steel sheet lamination 21, respectively, so that the laminated silicon steel sheets 211 are located between the upper and the lower insulating support 221, 222. In FIG. 2A, the fan stator structure 2 is shown upside-down, i.e. the end of the silicon steel sheet lamination 21 facing the lower insulating support 222 is a lower end, and the other end thereof facing the upper insulating support 221 is an upper end.

Figure 3A:
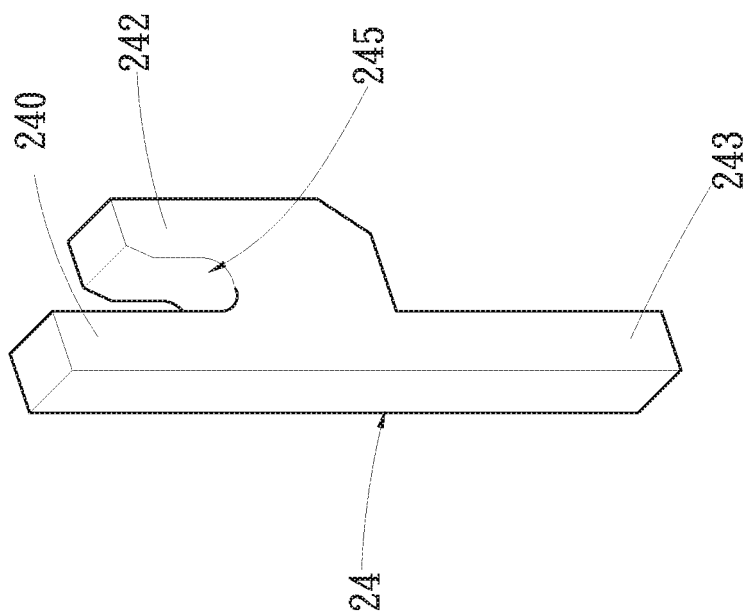
FIG. 3A is a perspective view of a conducting coil end holder included in the fan stator structure of the present invention.
Figure 5:
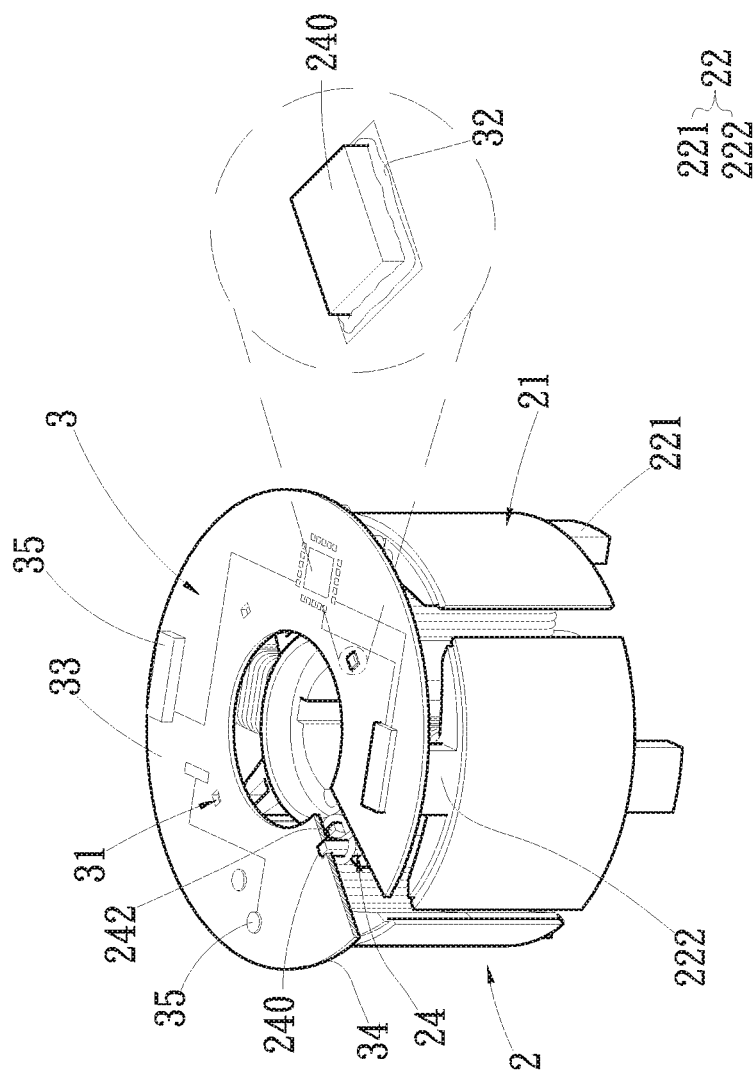
FIG. 5 shows the fan stator structure according to the embodiment of the present invention with a circuit board connected thereto.

The conducting coil end holders 24 are made of an electrically conductive material, which is selected from metal materials or non-metal materials. In the illustrated embodiment of the present invention, only two conducting coil end holders are shown. Referring to FIG. 3A, each of the conducting coil end holders 24 includes a fixing section 243, a connecting section 240 and a receiving zone 245 located between the fixing section 243 and the connecting section 240. The fixing section 243 and the connecting section 240 are located at two opposite ends of the conducting coil end holder 24. The fixing sections 243 of the conducting coil end holders 24 are respectively fixedly inserted into or assembled to a corresponding one of insulating support holes 223 formed on the lower insulating supports 222 of the set of insulating supports 22. However, in another operable embodiment, the fixing sections 243 of the conducting coil end holders 24 can be integrally formed on the lower insulating supports 222 through insert molding or injection molding. On the other hand, the connecting sections 240 are exposed from the lower insulating supports 222. Further, a projected section 242 is sidewardly extended from each of the connecting sections 240. The projected section 242 and the connecting section 240 together define the receiving zone 245. As shown in FIG. 5, the connecting sections 240 are electrically connected to a circuit board 3 by extending through, inserting into or welded to the circuit board 3, while the projected sections 242 are abutted on one side (i.e. a second surface 34) of the circuit board 3 that faces toward the silicon steel sheet lamination 21. For example, the receiving zones 245 may be in the form of a recessed portion, such as a cut, a notch or a groove, for respectively receiving a front end 251 and a back end 252 of the coils 25, so that the front and back ends 251, 252 of the coils 25 received in the receiving zones 245 are in direct contact with the conducting coil end holders 24. The projected section 242 is located at a height lower than or the same as that of the connecting section 240, such that the conducting coil holder 24 has a configuration of a reversed letter "h". However, it is understood the conducting coil end holder 24 is not limited to the above described configuration.

Figure 3B:
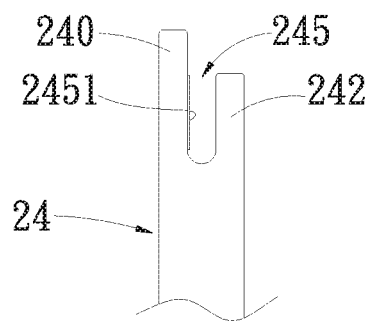
FIGS. 3B to 3F and FIGS. 4A and 4B illustrate different configurations possible for the conducting coil end holder in the present invention.
Figure 3C:
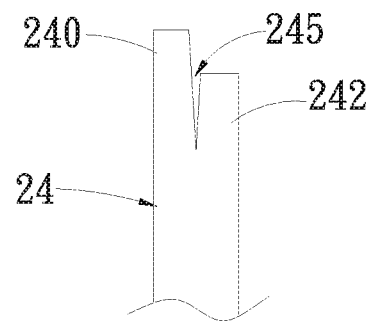
Figure 3D:
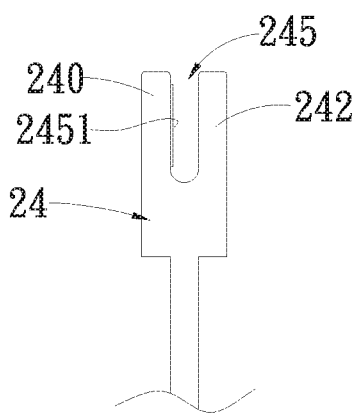
Figure 3E:
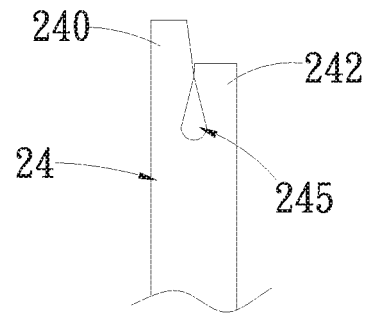
Figure 3F:
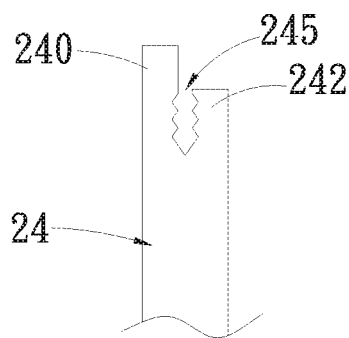
Figures 4A, 4B:
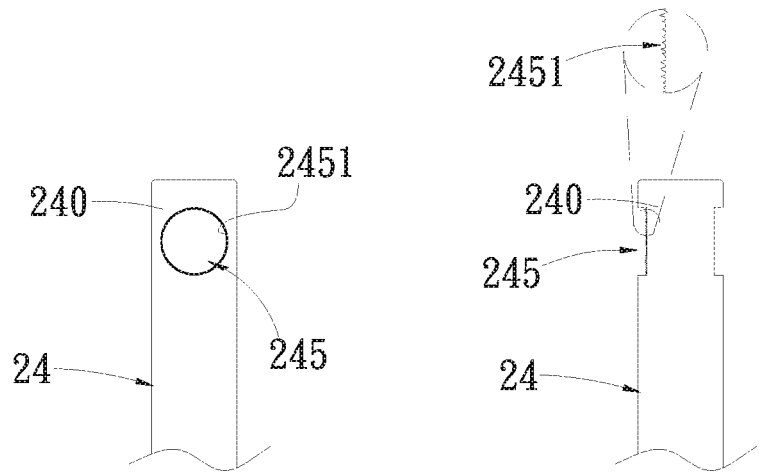

FIGS. 3B to 3F and FIGS. 4A and 4B illustrate different configurations possible for the conducting coil end holders 24 for receiving the front and back ends 251, 252 of the coils 25. The receiving zone 245 formed between the connecting section 240 and the projected section 242 can be substantially U-shaped as shown in FIG. 3B; or be V-shaped as shown in FIG. 3C; or looked like a fork defined by a projected section 242 and a connecting section 240 being equal in height, as shown in FIG. 3D; or looked like a droplet defined by a projected section 242 and a connecting section 240 that have inner upper ends correspondingly inwardly protruded to contact with each other, as shown in FIG. 3E; or have a toothed inner surface defined by the projected section 242 and the connecting section 240 that have a plurality of dents spaced on two inner facing side walls thereof, as shown in FIG. 3F. In another embodiment, the connecting section 240 is configured for extending through or inserting into the circuit board 3 to be electrically connected thereto. In this case, the receiving zone 245 can be in the form of a through hole as shown in FIG. 4A, or a narrowed neck portion as shown in FIG. 4B, or in the form of a notch, a cut or a groove (not shown), at where the front end 251 and the back end 252 of the coils 25 are wound, hung or extended to be in electrical contact with the conducting coil end holders 24.

The above described differently configured receiving zones 245 respectively have at least one contact surface 2451, which is a coarse, an unsmooth, a toothed or a sharp surface or a cutting face. When the front ends 251 and the back ends 252 of the coils 25 are set in the receiving zones 245 to contact with such a contact surfaces 2451, an insulating layer formed on the front and back ends 251, 252 are scraped or scratched off by the coarse contact surface 2451, allowing the front and back ends 251, 252 of the coils 25 to be electrically connected to the conducting coil end holders 24.

Please refer to FIG. 5. The circuit board 3 has a first surface 33 and an opposite second surface 34, and a plurality of vias 31. The first surface 33 has a plurality of electronic elements 35 provided thereon. The vias 31 are formed on the circuit board 3 at positions corresponding to the conducting coil end holders 24 and are extended from the first surface 33 through the circuit board 3 to the second surface 34, allowing the connecting sections 240 of the conducting coil end holders 24 to correspondingly extend from the second surface 34 to the first surface 33 directly and expose from the first surface 33. The circuit board 3 also has a plurality of weld pads 32 distributed on the first surface 33 along each of the vias 31. The connecting sections 240 of the conducting coil end holders 24 exposed from the first surface 33 are spot welded to the weld pads 32 to ensure good electrical connection of the conducting coil end holders 24 to the circuit board 3 and limit the connecting sections 240 to expose from the first surface 33 only by a proper welding length. Therefore, the problem in the conventional coil winding, including trimming and cutting of extra lengths of the coil front and back ends, is eliminated. Compared to the conventional fan stator, the fan stator structure according to the present invention can be manufactured with simplified procedures and shortened time.

In an alternative embodiment, the connecting sections 240 of the conducting coil end holders 24 are externally formed with a weldable layer, which can be heated to melt for the connecting sections 240 of the conducting coil end holders 24 exposed from the first surface 33 of the circuit board 3 to be welded to the weld pads 32 on the circuit board 3, so that the conducting coil end holders 24 are electrically connected to the circuit board 3.

Further, the front and back ends 251, 252 of the coils 25 in contact with the connecting sections 240 and the projected sections 242 can be welded to the latter by resistance welding or laser welding, so as to ensure better conductivity and bonding strength between the coils 25 and the conducting coil end holders 24.

In summary, the fan stator structure 2 designed according to the present invention can be manufactured with largely simplified manufacturing procedures, shortened assembling time and reduced labor, enabling lowered manufacturing costs and upgraded good yield rate. The present invention effectively eliminates the problems in the conventional coil winding operation, including the complicated and time and labor consuming manufacturing procedures, low good yield rate and high manufacturing costs.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A fan stator structure, comprising:
a silicon steel sheet lamination formed of a plurality of laminated silicon steel sheets located between a set of insulating supports and having coils wound thereon, the set of insulating supports including an upper and a lower insulating support, the silicon steel sheet lamination being located between the upper and the lower insulating support, the lower insulating support defining a plurality of insulating support holes; and
a plurality of conducting coil end holders, each of which includes a fixing section, a connecting section, and a receiving zone located between the fixing section and the connecting section; the fixing section and the connecting section being located at two opposite ends of the conducting coil end holder, and the fixing section of each of the plurality of conducting coil end holders being received in a separate one of the plurality of insulating support holes of the lower insulating support of the set of insulating supports; and the receiving zone being configured for receiving a front end and a back end of the coils therein, so that the front and back ends of the coils are in contact with the conducting coil end holders;
wherein each of the conducting coil end holders further includes a projected section sidewardly extended from a position near the connecting section; and the connecting section and the projected section together defining the receiving zone as a recess;
wherein the connecting section of the conducting coil end holder is extending through and electrically connected to a circuit board, the circuit board having a first surface and an opposite second surface, the connecting section being extending from the second surface to the first surface directly and exposing from the first surface, and the projected section being abutted on the second surface of the circuit board that faces toward the silicon steel sheet lamination.

2. The fan stator structure as claimed in claim 1, wherein the receiving zone has a configuration selected from the group consisting of a notch, a cut, a groove, a narrowed neck portion, and a through hole.

3. The fan stator structure as claimed in claim 1, wherein the connecting sections of the conducting coil end holders are respectively externally provided with a weldable layer for electrical connection to the circuit board.

4. The fan stator structure as claimed in claim 1, wherein the front and back ends of the coils are correspondingly connected to the conducting coil end holders in a manner selected from the group consisting of resistance welding and laser welding.

5. The fan stator structure as claimed in claim 1, wherein the fixing sections of the conducting coil end holders are located on the set of insulating supports by any one of the following ways: being assembled to the set of insulating supports and being integrally formed with the set of insulating supports.

* * * * *